United States Patent [19]

Funahashi et al.

[11] Patent Number: 5,512,265

[45] Date of Patent: Apr. 30, 1996

[54] METHOD OF PRODUCING AQUEOUS SOLUTION OF SLAKED LIME AND APPARATUS THEREFOR

[75] Inventors: Isao Funahashi, Fukushima; Kiwamu Yamamoto, Kanagawa; Koju Suto, Fukushima, all of Japan

[73] Assignees: Kureha Kagaku Kogyo Kabushiki Kaisha, Tokyo; Kureha Engineering Co., Ltd., Fukushima, both of Japan

[21] Appl. No.: 326,349

[22] Filed: Oct. 20, 1994

Related U.S. Application Data

[63] Continuation of Ser. No. 220,581, Mar. 31, 1994, abandoned, which is a continuation of Ser. No. 868,695, Apr. 15, 1992, abandoned.

[30] Foreign Application Priority Data

Apr. 26, 1991 [JP] Japan .................. 3-125301

[51] Int. Cl.⁶ .................. C01F 11/02; B01F 7/18
[52] U.S. Cl. .................. 423/640; 422/224; 422/225; 422/228; 422/232; 422/261; 210/540
[58] Field of Search .................. 422/225, 228, 422/232, 162, 168, 169; 423/640; 210/522, 540

[56] References Cited

U.S. PATENT DOCUMENTS

| | | | |
|---|---|---|---|
| 2,694,000 | 11/1954 | Azbe | 422/162 |
| 3,130,014 | 4/1964 | Stanton | 422/228 |
| 4,110,211 | 8/1978 | Henrikson | 210/716 |
| 4,202,778 | 5/1980 | Middelbeek | 210/522 |
| 4,203,849 | 5/1980 | Ino et al. | 210/522 |
| 4,271,128 | 6/1981 | Schrodter et al. | 422/228 |
| 4,366,142 | 12/1982 | Kojima et al. | 422/228 |
| 4,389,376 | 6/1983 | Kojima et al. | 422/228 |
| 4,427,643 | 1/1984 | Fowler | 423/580 |
| 4,664,802 | 5/1987 | Lee | 210/522 |
| 4,861,558 | 8/1989 | Lehto | 422/169 |

FOREIGN PATENT DOCUMENTS

| | | |
|---|---|---|
| 247541 | 11/1926 | United Kingdom . |
| 478354 | 1/1938 | United Kingdom . |
| 2048107 | 3/1980 | United Kingdom . |

*Primary Examiner*—Robert J. Warden
*Assistant Examiner*—Hien Tran
*Attorney, Agent, or Firm*—Sughrue, Mion, Zinn, Macpeak & Seas

[57] ABSTRACT

A method of producing an aqueous solution of slaked lime is disclosed the steps of: introducing water into a slaked lime-dissolving apparatus comprising a dissolving tank, a water supply piping connected to a lower part of the tank, a stirring blade disposed within the tank in its bottom part, an effluent piping connected to an upper part of the tank for discharging aqueous slaked lime solution, and a fluidized slaked lime layer height-control device disposed within the tank above the stirring blade, subsequently introducing a predetermined amount of slaked lime into the tank, feeding water, with low-speed stirring, to the tank from the water supply piping in such a rate that the water in the cylindrical or rectangular upper part of the tank ascends at a rate of from 0.25 to 1.2 mm/sec, and taking out an aqueous solution of slaked lime from the tank through the effluent piping.

6 Claims, 2 Drawing Sheets

METHOD OF PRODUCING AQUEOUS SOLUTION OF SLAKED LIME AND APPARATUS THEREFOR

This is a Continuation of application Ser. No. 08/220,581 filed Mar. 31, 1994, which is a continuation of Ser. No. 07/868,695 filed Apr. 15, 1992, now both abandoned.

FIELD OF THE INVENTION

The present invention relates to a method and apparatus for the production of an aqueous solution of slaked lime to be used for improving the quality of tap water.

BACKGROUND OF THE INVENTION

Conventionally known techniques for preventing tap water from being supplied as "red water" include caustic soda injection, soda ash injection, and slaked lime injection. Of these, slaked lime injection is recently attracting attention and is increasingly adopted in water purification plants of tap water suppliers, because not only does slaked lime serve to increase the pH of water to be treated but also it is said that calcium contained in slaked lime as a major component is good for human health, and because a technique of injecting slaked lime not as a powder but as an aqueous solution has been developed.

With respect to the continuous production of an aqueous solution of slaked lime, a method using such an apparatus is disclosed in, for example, U.S. Pat. No. 4,389,376. The method described in U.S. Pat. No. 4,389,376 uses an apparatus comprising a tank in which its upper part is cylindrical or rectangular while its lower part is in the shape of an inverted truncated cone, a water supply piping and an insoluble material discharge piping both connected to a bottom part of the tank, agitator blades revolving horizontally and disposed over the outlet end of the water supply piping, and an overflow solution-receiving part provided by the edge of the tank top and having a discharge piping for taking out aqueous slaked lime solution. In this method, a layer of accumulated slaked lime particles is formed in the tank and, with low-speed stirring, water is supplied at a constant rate from the lower part of the tank and an aqueous solution of slaked lime is taken out from the upper part of the tank.

However, in such a slaked lime-dissolving tank in which only an agitator has been disposed, water feeding should be conducted at such a low rate that the water in the upper part of the tank ascends at a rate of about 0.2 mm/sec at the most because there is the possibility that too high a water feeding rate may cause the effluent aqueous solution of slaked lime to carry part of the slaked lime slurry blanket. Such a water ascent rate is too low from the standpoint of practically using the apparatus in large-scale water treatment plants. Therefore, the above conventional apparatus has a drawback that for use in large-scale water treatment plants, the apparatus should have an increased size or should be installed in a large number, resulting in the necessity of a large installation area and in an increased construction cost.

SUMMARY OF THE INVENTION

The present inventors have conducted intensive studies in order to develop a slaked lime-dissolving apparatus in which water can be fed to the dissolving tank at an increased feed rate and hence at an increased water ascent rate in the dissolving tank, while preventing slaked lime fine particles from flowing out of the tank, thereby to increase the amount of aqueous slaked lime solution produced per unit time and unit apparatus volume and to attain a reduction in apparatus size. As a result, they have succeeded in developing such an apparatus by disposing, in a slaked lime-dissolving tank, a device for controlling the height of a fluidized slaked lime layer. The present invention has thus been accomplished.

Accordingly, the present invention provides a method of producing an aqueous solution of slaked lime which comprises introducing water into a slaked lime-dissolving apparatus comprising a dissolving tank of a cylindrical or rectangular shape, a water supply piping connected to a lower part of the tank, a stirring blade disposed within the tank in its bottom part, an effluent piping for discharging aqueous slaked lime solution which is connected to an upper part of the tank, and a fluidized slaked lime layer height-control device disposed within the tank above the stirring blade, subsequently introducing a predetermined amount of slaked lime into the tank, feeding water, with low-speed stirring, to the tank from the water supply piping in such a rate that the water in the cylindrical or rectangular upper part of the tank ascends at a rate of from 0.25 to 1.2 mm/sec, and taking out an aqueous solution of slaked lime from the tank through the effluent piping.

The present invention further provides an apparatus for producing aqueous slaked lime solution which comprises a dissolving tank of a cylindrical or rectangular shape, a water supply piping connected to a lower part of the tank, a stirring blade disposed within the tank in its bottom part, an effluent piping for discharging aqueous slaked lime solution which is connected to an upper part of the tank, and a fluidized slaked lime layer height-control device disposed within the tank above the stirring blade.

DETAILED DESCRIPTION OF THE INVENTION

The apparatus used in the present invention for producing aqueous slaked lime solution comprises a dissolving tank of a cylindrical or rectangular shape, a water supply piping connected to a lower part of the tank, and an effluent piping for discharging aqueous slaked lime solution which is connected to an upper part of the tank. The tank is also equipped with stirring blades disposed in a bottom part thereof. Further, a device for controlling the height of a fluidized layer of slaked lime particles has been disposed within the tank above the stirring blade.

In the case where slaked lime and water are introduced beforehand into a dissolving tank and, thereafter, water is further fed with stirring from the lower part of the tank, the slaked lime dissolves gradually while forming a fluidized layer of slaked lime particles in the bottom part of the dissolving tank. The height of this fluidized layer increases with increasing water feed rate (water ascent rate within the tank) and, hence, too high a water feed rate may cause undissolved slaked lime particles to be included in the aqueous slaked lime solution discharged from the upper part of the tank. The ascent of slaked lime particles with ascending water flows can be prevented by disposing, within the dissolving tank, a resister that suppresses the ascending water flows. Therefore, by providing such a resister in a slaked lime-dissolving tank, the height of the fluidized layer of slaked lime particles can be kept relatively low and undissolved slaked lime particles can be prevented from being discharged, even when the water ascent rate is increased to some degree. In the present invention such a resister is referred to as a fluidized layer height-control device.

Figure 1:
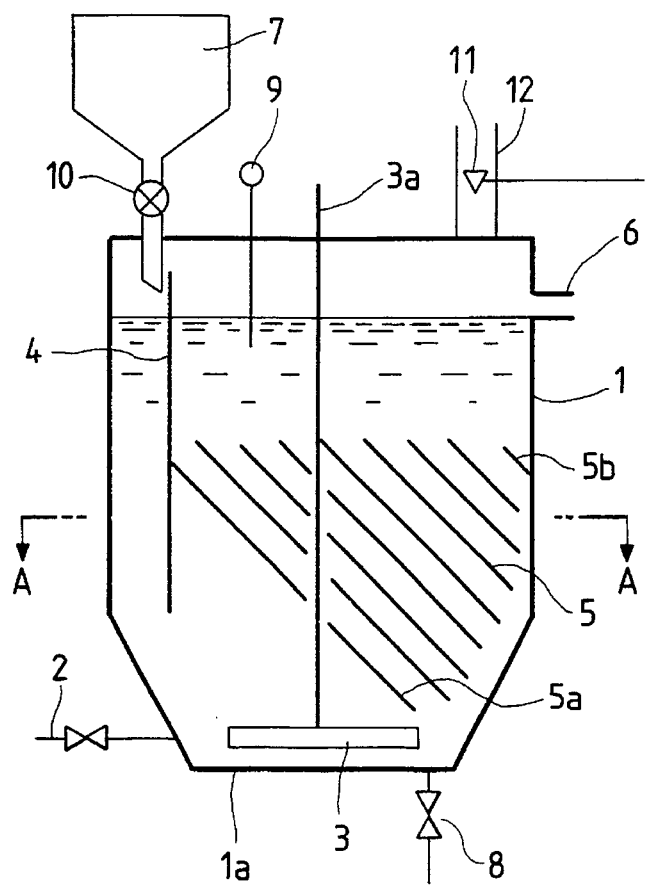
FIG. 1 is a sectional view illustrating one embodiment of the apparatus according to the present invention.

The fluidized layer height-control device to be employed in the dissolving tank used in the present invention may have any of various structures. A representative example thereof is one comprising slant plates as shown in FIG. 1. The slaked lime-dissolving apparatus illustrated in FIG. 1 in which slant plates as the fluidized slaked lime layer height-control device have been disposed in the dissolving tank is explained below.

In FIG. 1, numeral 1 denotes a dissolving tank of a cylindrical or rectangular shape. The dissolving tank preferably is one in which its upper part is of a cylindrical shape and its lower part is in the shape of an inverted truncated cone. Numeral 2 denotes a water supply piping and numeral 3 denotes stirring blades. Numeral 4 denotes a partition plate for forming a slaked lime-introducing part beside the side wall of the cylindrical part of the tank 1, while numeral 5 denotes slant plates as a fluidized slaked lime layer height-control device which have been disposed aslant between the partition plate 4 and the opposite side of the tank. Numeral 6 denotes an effluent or discharging piping for discharging aqueous slaked lime solution.

The partition plate 4 serves to form a zone into which slaked lime is to be introduced from the upper side of the tank 1 and which is free from slant plates (fluidized layer height-control device). The partition plate 4 extends from above the surface of the water in the tank 1 to a place which is above the stirring blade disposed in the lower part of the tank 1 and which is far below the water surface as much as possible, so as to form a zone sufficient for slaked lime feeding beside the tank wall. In the case where the lower part of the dissolving tank is of an inverted cone shape, it is preferred that the partition plate 4 be disposed so that it extends to the inverted cone part.

Figure 2:
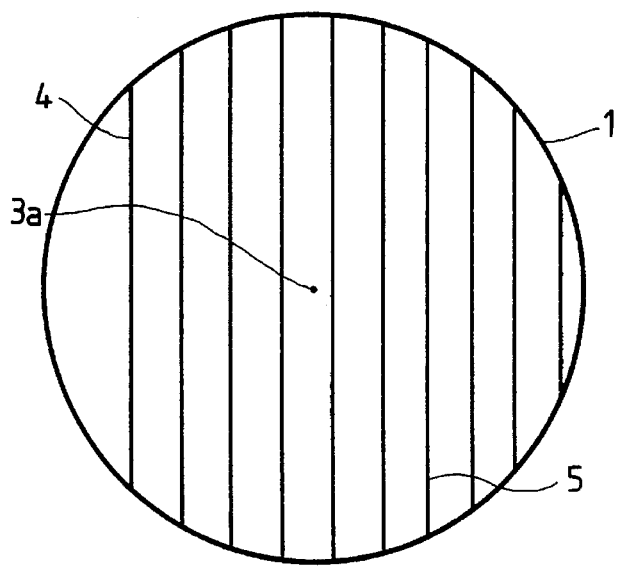
FIG. 2 is a sectional view taken on line A—A of FIG. 1.

Two or more slant plates 5 are arranged apart from each other, preferably at an equal distance, between the partition plate 4 and the effluent piping-side tank wall. The slant plates 5 are slanted in such a manner that they face the tank's part where the effluent piping 6 for discharging aqueous slaked lime solution has been disposed, with the lower ends thereof being positioned nearer to the effluent piping-side tank wall and the upper ends thereof being positioned nearer to the partition plate 4. FIG. 2 is a sectional view taken on line A—A of FIG. 1. The lowermost slant plate 5a has been disposed in such a manner that its upper end is in contact with the partition plate 4 and its lower end is positioned between the shaft 3a for the stirring blade 3 and the effluent piping-side tank wall. The other slant plates have been positioned above and in parallel with the slant plate 5a, with the distance between plates being preferably from 5 to 50 mm. The upper ends of these slant plates are positioned from 20 to 100 cm below the water surface, while the lower ends thereof are positioned from 10 to 30 cm apart from the tank wall, provided that the lower end of the uppermost slant plate 5b is in contact with the tank wall with no space therebetween to prevent a slaked lime slurry from short-cutting along the tank wall. As can be clearly seen in FIG. 1, the slant plates in combination are positioned so as to be directly above an entire area defined by the locus of rotation of the stirring blade 3. In FIG. 1, numeral 7 denotes a hopper for introducing slaked lime, 8 a discharge piping for discharging insoluble substrates, and 9 a level controller.

An exemplary method for the production of an aqueous solution of slaked lime using the apparatus shown in FIG. 1 is explained below.

Water is first introduced into the dissolving tank 1 in an amount about ⅔ of the capacity of the tank, and slaked lime is then fed as a powder or 10–30% slurry while the water in the tank is being stirred with the stirring blades 3. In the case where slaked lime is fed as a powder, it is introduced in a predetermined amount from the hopper 7 through a rotary valve 10. In order to conduct this feeding of powdery slaked lime while preventing slaked lime particles from being scattered outside the tank, a slaked lime particle collector 12 having a water spray nozzle 11 therein is disposed and scattering of slaked lime particles during feeding of powdery slaked lime is prevented by water spraying.

After completion of the feeding of slaked lime, water feeding through the water supply piping 2 is initiated and at the time when the water level reaches a predetermined height slightly below the inlet of the effluent piping 6 for discharging aqueous slaked lime solution, the water feeding is ceased by a signal from the level controller 9. Thereafter, the contents are stirred for about an hour, thereby allowing slaked lime particles present in the upper part of the tank to descend and, at the same time, making a uniform slaked lime slurry layer in the lower part of the tank. Subsequently, water is fed with stirring to the tank 1 at a predetermined feed rate through the water supply piping 2. The water thus fed to the tank at a constant rate passes through the slaked lime slurry layer with low-speed stirring and reaches the inlet of the effluent piping 6, during which the water becomes aqueous slaked lime solution having a slaked lime concentration of about 1,600 ppm. This solution is taken out from the tank through the effluent piping 6. The peripheral rotational speed of the stirring blade may be as low as 1 m/sec or less, preferably 0.5 m/sec or less.

If the dissolving tank does not have a fluidized slaked lime layer height-control device therein, the water fed to the tank ascends therein almost perpendicularly and, because of this, the water feed rate in this case should be kept very low in order to avoid the inclusion of slaked lime fine particles into the effluent solution. However, in the case of using the dissolving tank equipped with the slant plates 5 as a fluidized slaked lime layer height-control device as described above, the slaked lime introduced into the tank forms a thick slurry in the bottom part of the tank. Although this slurry layer ascends in the tank, it is prevented from ascending perpendicularly due to the slant plate 5a. That is, the slaked lime slurry circulates in a flow buffer chamber which is the space surrounded by the stirring blades 3, slant plates 5a, partition plate 4, and tank wall. On the other hand, part of the slaked lime slurry ascends between the slant plates from the lower end parts thereof. However, this ascent of slaked lime slurry is suppressed by each upper-side slant plate and, as a result, the slaked lime particles fall along the slant plates. In order to enable the slant plates to exhibit such a function as a fluidized slaked lime layer height-control device, they are disposed at a slant angle of generally from 45° to 75°, preferably from 55° to 65°, with the water surface. Slant angles either larger than the upper limit or smaller than the lower limit prevent the slant plates from sufficiently performing their function as a fluidized slaked lime layer height-control device. The shorter the distance between each adjacent two slant plates, the more preferred. Specifically, the plate distance is generally 50 mm or less, desirably 30 mm or less. It should, however, be noted that too short a plate distance not only results in an increase in the number of slant plates and, hence, a decrease in the actual capacity of the tank, but also may leads to scale development and clogging by scales. For this reason, the plate distance is generally 5 mm or more, preferably 15 mm or more. By allowing the water fed from the lower part of the tank to ascend through such slant plates (fluidized slaked lime layer height-control device), it has become possible to conduct water feeding through the water supply piping at such a high rate that the water ascent rate in the cylindrical or rectangular upper part of the tank is from 0.25 to 1.2 mm/sec. That is, even if water is fed to the tank at a rate several times, e.g., about 4 times, that for dissolving tanks having no slant plates, the water which has reached the inlet of the effluent piping is taken out from the tank as aqueous slaked lime solution containing almost no slaked lime fine particles. This solution has a slaked lime concentration of about 1,600 ppm and can be advantageously used for quality improvement of tap water.

Figure 3:
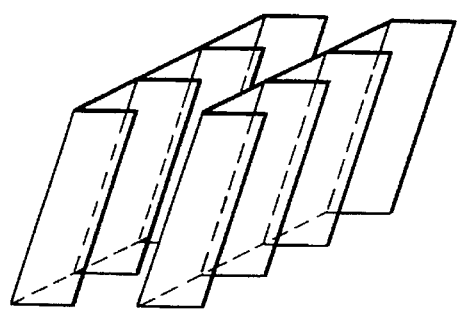
FIGS. 3 to 9 are perspective views showing other examples of the fluidized slaked lime layer height-control device employed in the apparatus of the present invention.
Figure 4:
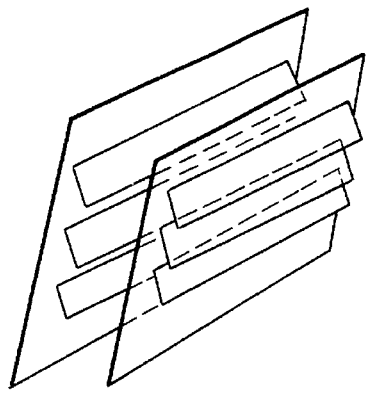
Figure 5:
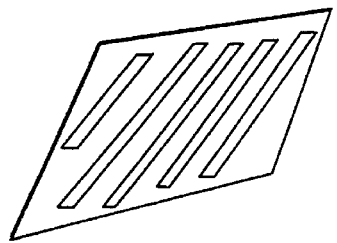
Figure 6:
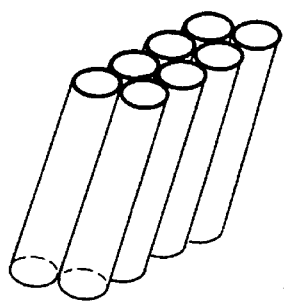
Figure 7:
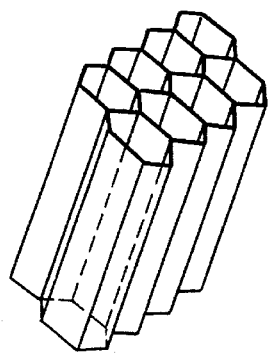
Figure 8:
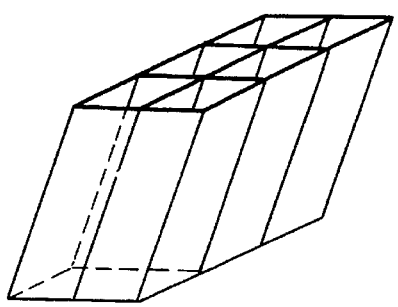
Figure 9:
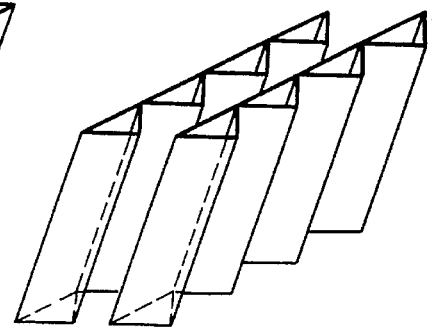

In place of the above-described slant plates, various kinds of fluidized slaked lime layer height-control devices may be used. For example, as shown in FIGS. 3 to 5, the above-described slant plates may be fitted, on their back (lower) side, with projecting walls extending in the vertical or horizontal direction or in an oblique direction. Such projecting walls serve to enhance the effect of controlling the height of a fluidized slaked lime layer. In the case of employing such slant plates having projecting walls on the back side, the plates can be disposed at a longer plate distance than the above-described slant plates having no projecting walls, specifically at a distance of from 20 to 100 mm, preferably from 30 to 70 mm, at a slant angle of from 45° to 75°.

Further, a structure comprising a combination of a plurality of cylindrical or prismatic cells, such as those as shown in FIGS. 6 to 9, may be disposed aslant in the tank likewise. The inner diameter of such cylindrical or prismatic cells (the maximum inner diameter in the case of prismatic cells) is generally from 10 to 50 mm, preferably from 20 to 40 mm, for the same reasons as those for the distance between the above-described slant plates. The structure comprising such cells is disposed aslant at an angle of generally from 45° to 75°, thereby enabling it to control the height of a fluidized slaked lime layer.

In disposing such a fluidized slaked lime layer height-control device in a dissolving tank, each of the slant plates or cylindrical or prismatic cells may be directly fixed to the inner wall of the dissolving tank. Preferably, however, the slant plates or cylindrical or prismatic cells are united into one structure beforehand and this structure is fitted and fixed to the dissolving tank to give a fluidized slaked lime layer height-control device. In this case, a hole or holes through which a stirrer shaft $3a$ is to extend should, of course, be formed in the fluidized slaked lime layer height-control device.

As described above, by disposing a fluidized slaked lime layer height-control device in a slaked lime-dissolving tank according to the present invention, it has become possible to produce substantially saturated aqueous slaked lime solution almost without inclusion of undissolved slaked lime particles into the solution even when water feeding to the dissolving tank is conducted several times rapidly than that to conventional dissolving tanks. Accordingly, the amount of aqueous slaked lime solution produced per unit apparatus volume and per unit time can be increased and the dissolving apparatus can be smaller-sized and be installed in a smaller area. Therefore, the method and apparatus of the present invention are very easily applicable to water quality improvement in large-scale water treatment plants.

The present invention is explained below in more detail with reference to the following examples, but the invention is not construed as being limited thereto.

EXAMPLE

Aqueous slaked lime solution was produced using an aqueous slaked lime solution-producing apparatus the construction of which was substantially the same as that illustrated in FIG. 1. The dissolving tank in this apparatus consisted basically of a cylindrical upper part and a lower part in the shape of an inverted truncated cone, had an inner diameter of 300 mm and a height of 2 m, and was equipped with twelve slant plates disposed therein apart from each other at a distance of 10 mm and aslant at an angle of 60° with the water surface.

At first, water was introduced into the dissolving tank in an amount about ⅔ of the capacity of the tank and 8 kg of a powder of slaked lime was then introduced thereinto. Subsequently, water was fed to the tank from its lower part while revolving the stirring blade at 18 rpm (peripheral rotational speed of the stirring blade: 0.19 m/sec) and, at the time when the water level had reached a height 20 cm below the inlet of the effluent piping for discharging aqueous slaked lime solution, the water feeding was ceased. Stirring was then continued for about an hour thereby to allow slaked lime particles present in the upper part of the tank to descend. During this stirring without water feeding, the height of the fluidized layer of slaked lime particles was 50 cm as measured from the tank bottom.

Water was then fed from the lower part of the dissolving tank at a rate of 144 l/hr (water ascent rate at the cylindrical upper part of the dissolving tank: 0.56 mm/sec) with stirring at the same speed, whereby aqueous slaked lime solution was discharged from the tank through the effluent piping. The thus-obtained solution had a pH value of 12.8, a slaked lime concentration of 1,780 ppm, and a suspended solid content of 50 ppm.

COMPARATIVE EXAMPLE

The same apparatus as that used in Example except that no slant plate had been disposed therein was operated under the same conditions as in Example. During the stirring without water feeding, the height of the fluidized layer of slaked lime particles was 120 cm as measured from the tank bottom. When water was fed with stirring from the lower part of the dissolving tank at a rate of 144 l/hr, the fluidized layer reached the water surface in 30 minutes and, as a result, a slaked lime slurry began flowing out through the effluent piping for discharging aqueous slaked lime solution.

Further, the water feeding with stirring was conducted at various water feed rates so as to produce aqueous slaked lime solution without causing a slaked lime slurry to flow out. As a result, aqueous slaked lime solution having a suspended solid content of 60 ppm was obtained when the water feed rate was as low as 36 l/hr (water ascent rate in the cylindrical upper part of the tank: 0.14 mm/sec).

While the invention has been described in detail and with reference to specific embodiments thereof, it will be apparent to one skilled in the art that various changes and modifications can be made therein without departing from the spirit and scope thereof.

What is claimed is:

1. A method of producing an aqueous solution of slaked lime comprising the steps of:

providing an apparatus comprising:

a dissolving tank;

water supply piping connected to a lower part of the dissolving tank for introducing water into the dissolving tank;

effluent piping connected to an upper part of the dissolving tank for discharging aqueous slaked lime solution from the dissolving tank;

a stirring blade disposed within the dissolving tank in a bottom part thereof;

a partition plate disposed within the dissolving tank and beside a side wall of the dissolving tank, said partition plate extending from above a surface of water in the dissolving tank to above the stirring blade for providing a slaked lime introducing zone which is surrounded by the partition plate and the side wall of the dissolving tank;

a hopper disposed above the slaked lime introducing zone for introducing powder of slaked lime into the dissolving tank; and a fluidized slaked lime layer height-control device disposed within the dissolving tank in an outside part of the slaked lime introducing zone above the stirring blade for preventing slaked lime particles from ascending with ascending aqueous slaked lime solution in the dissolving tank, said fluidized slaked lime layer height-control device having at least two slant plates, wherein an upper end of a lowermost slant plate is disposed in contact with the partition plate and a lower end of an uppermost slant plate is disposed in contact with a side wall of the dissolving tank;

introducing the powder of slaked lime into the slaked lime introducing zone of the dissolving tank through the hopper;

feeding water, with low speed stirring, to the dissolving tank through the water supply piping at a predetermined rate so that the water ascent rate at an upper part of the dissolving tank is between 0.25 to 1.2 mm/sec; and removing an aqueous solution of slaked lime from the dissolving tank through the effluent piping.

2. An apparatus for producing aqueous slaked lime solution, comprising:

a dissolving tank;

water supply piping connected to a lower part of the dissolving tank for introducing water into the dissolving tank;

effluent piping connected to an upper part of the dissolving tank for discharging aqueous slaked lime solution from the dissolving tank;

a stirring blade disposed within the dissolving tank in a bottom part thereof;

a partition plate disposed within the dissolving tank and beside a side wall of the dissolving tank, said partition plate extending from above a surface of water in the dissolving tank to above the stirring blade for providing a slaked lime introducing zone which is surrounded by the partition plate and the side wall of the dissolving tank;

a hopper disposed above the slaked lime introducing zone for introducing powder of slaked lime into the dissolving tank; and a fluidized slaked lime layer height-control device disposed within the dissolving tank in an outside part of the slaked lime introducing zone above the stirring blade for preventing slaked lime particles from ascending with ascending aqueous slaked lime solution in the dissolving tank, said fluidized slaked lime layer height-control device having at least two slant plates, wherein an upper end of a lowermost slant plate is disposed in contact with the partition plate and a lower end of an uppermost slant plate is disposed in contact with a side wall of the dissolving tank.

3. The apparatus of claim 2, wherein said at least two slant plates are disposed apart from each other by a distance ranging from 5 to 50 mm and being inclined at an angle from 45° to 75° with respect to a water surface in the dissolving tank, the fluidized slaked lime layer height-control device being positioned directly above an entire area defined by the locus of rotation of the stirring blade.

4. The apparatus of claim 2, wherein the at least two slant plates are integrally connected to one another and are positioned in the dissolving tank as integral structure.

5. An apparatus for producing aqueous slaked lime solution, comprising:

a dissolving tank;

water supply piping connected to a lower part of the dissolving tank for introducing water into the dissolving tank;

effluent piping connected to an upper part of the dissolving tank for discharging aqueous slaked lime solution from the dissolving tank;

a stirring blade disposed within the dissolving tank in a bottom part thereof;

a partition plate disposed within the dissolving tank and beside a side wall of the dissolving tank, said partition plate extending from above a surface of water in the dissolving tank to above the stirring blade for providing a slaked lime introducing zone which is surrounded by the partition plate and the side wall of the dissolving tank;

a hopper disposed above the slaked lime introducing zone for introducing powder of slaked lime into the dissolving tank; and a fluidized slaked lime layer height-control device disposed within the dissolving tank in an outside part of the slaked lime introducing zone above the stirring blade for preventing slaked lime particles from ascending with ascending aqueous slaked lime solution in the dissolving tank, the fluidized slaked lime layer height-control device comprising a plurality of interconnected cylindrical members disposed at a predetermined angle with respect to a water surface in the dissolving tank, wherein an upper end of a lowermost member is disposed in contact with he partition plate and a lower end of an uppermost member is disposed in contact with a side wall of the dissolving tank.

6. An apparatus for producing aqueous slaked lime solution, comprising;

a dissolving tank;

water supply piping connected to a lower part of the dissolving tank for introducing water into the dissolving tank;

effluent piping connected to an upper part of the dissolving tank for discharging aqueous slaked lime solution from the dissolving tank;

a stirring blade disposed within the dissolving tank in a bottom part thereof;

a partition plate disposed within he dissolving tank and beside a side wall of the dissolving tank, said partition plate extending from above a surface of water in the dissolving tank to above the stirring blade for providing a slaked lime introducing zone which is surrounded by the partition plate and the side wall of the dissolving tank;

a hopper disposed above the slaked lime introducing zone for introducing powder of slaked lime into the dissolving tank; and a fluidized slaked lime layer height-control device disposed within the dissolving tank in an outside part of the slaked lime introducing zone above the stirring blade for preventing slaked lime particles from ascending with ascending aqueous slaked lime solution in the dissolving thank, the fluidized slaked lime layer height-control device comprising a plurality of elongated members each having a longitudinal hole extending therethrough in such a manner that a longitudinal axis of each hole is disposed at an inclined angle with respect to a water surface in the dissolving tank, wherein an upper end of a lowermost member is disposed in contact with he partition plate and a lower end of an uppermost member is disposed in contact with a side wall of the dissolving tank.

* * * * *